United States Patent [19]
Mallon et al.

[11] 3,930,412
[45] Jan. 6, 1976

[54] ELECTRICALLY SCANNED PRESSURE TRANSDUCER CONFIGURATIONS

[75] Inventors: Joseph R. Mallon, Alpine; Anthony D. Kurtz, Englewood; John C. Kicks, Wyckoff, all of N.J.

[73] Assignee: Kulite Semiconductor Products, Inc., Ridgefield, N.J.

[22] Filed: Jan. 3, 1975

[21] Appl. No.: 538,351

[52] U.S. Cl. ............... 73/398 AR; 73/406; 73/420; 338/4
[51] Int. Cl.² ......................................... G01L 9/06
[58] Field of Search ....... 73/398 AR, 420, 147, 180, 73/406, 407 R, 407 PR; 338/4, 42, 36

[56] References Cited
UNITED STATES PATENTS

| | | | |
|---|---|---|---|
| 2,551,526 | 5/1951 | Campbell | 73/147 |
| 2,807,167 | 9/1957 | Statham | 73/398 A |
| 2,882,731 | 4/1959 | Peucker | 73/147 |
| 3,641,812 | 2/1972 | Vick | 73/88.5 SD |
| 3,683,698 | 8/1972 | Tomanec et al. | 73/88.5 SD |

*Primary Examiner*—Donald O. Woodiel
*Attorney, Agent, or Firm*—Arthur L. Plevy

[57] ABSTRACT

A plurality of individual pressure transducers are mounted or fabricated within a common housing. Each pressure transducer is associated with a separate and distinct pressure port and can be subjected to a different one of a plurality of pressure sensitive locations to be monitored. The pressure transducers can be electrically scanned by means of a scanning device such as a shift register or counter so their individual outputs can be monitored and recorded.

10 Claims, 13 Drawing Figures

ELECTRICALLY SCANNED PRESSURE TRANSDUCER CONFIGURATIONS

BACKGROUND OF INVENTION

This invention relates to electromechanical transducers and, more particularly, to a transducer configuration employing a number of separate transducers for monitoring a plurality of different pressure sensitive areas.

Pressure transducers employing semiconductor devices as piezoresistors are in wide-spread use and serve to measure force or pressure in a number of different environments.

One particular application is the use of such devices for measuring pressures or forces exerted on a model placed in a wind tunnel to define flow phenomenon. As such, the ultra-minature transducers or those employing piezoresistive bridge configurations, mounted on silicon diaphragms of between 0.25 to 0.03 inches or less, have received widespread use in wind tunnel applications for measuring pressure fluctuations in the local outside area of inlet/engine subsystems.

There are many considerations employed in the design and fabrication of transducers for such environments and a good review of such requirements may be had by referring to a publication entitled NOTES ON APPLICATIONS OF INTEGRATED SENSOR (IS) PRESSURE TRANSDUCER, Published by Kulite Semiconductor Products, Inc. as Application Note KPS-AN11. This publication contains a series of articles depicting and defining transducer requirements for wind tunnel tests and the like.

In any event, a wind tunnel or similar test on an engine, or an airplane part requires the measuring and monitoring of pressure at a relatively large number of points about and along the test object.

The prior art utilized many approaches to accomplish this. Separate transducers for each point could be employed, but present a problem in regard to calibration of each device, offset differences between each transducer due to manufacturing techniques and so on.

Another widely used approach was employing one or more high quality transducer assemblies and using the single assembly to monitor a plurality of points by mechanically switching a plurality of pressure tubes coupled between the transducer and each point to be monitored.

This system employed mechanical scanners, valves to close or open the pressure ports and so on. The mechanical switching assemblies and the valves experience high failure rate and are difficult and expensive to maintain.

Furthermore, the rate of mechanical scanning is substantially limited due to mechanical operation as well as the necessity of allowing the transducer to equalize each time a new pressure point is accessed. For example, if one high quality transducer is switched between varying pressure points, it is possible that the point may be at a pressure of 100 psi and the next succeeding point may be at a pressure of 10 psi or ten times less.

The transducer employs a moving diaphragm, has hysteresis and the system has inertia. Hence, if the scanning rate is fast, the output will be incorrect since the reading of the transducer will be determined by the previous pressure.

It is therefore an object of the present invention to provide a multiple pressure transducer configuration having the capability of monitoring a plurality of pressure points by a plurality of individual transducers, fabricated by similar techniques and mounted in a common housing, thus subjecting all the transducers to a similar environment.

BRIEF DESCRIPTION OF PREFERRED EMBODIMENT

A multiple, pressure port transducer apparatus, comprising of a hollow housing, including mounted therein a plurality of pressure transducers, each one containing at least one pressure sensitive element mounted on a pressure sensitive diaphragm, said plurality of transducers being encased within said hollow of said housing and located relatively about the periphery thereof, said housing including a top surface having a plurality of tubular cylindrical pressure ports positioned in apertures in said surface, each one of which being aligned with one selected one of said transducers in said housing, whereby each transducer is associated with one tubular pressure port, a slot in said housing for accommodating a plurality of leads and means for coupling selected ones of said leads to selected ones of said transducers, whereby each transducer has at least one lead associated therewith for monitoring any change in said pressure sensitive element caused by a force applied to any one of said ports and therefore to said aligned diaphragms.

DETAILED DESCRIPTION OF FIGURES

Figure 1:
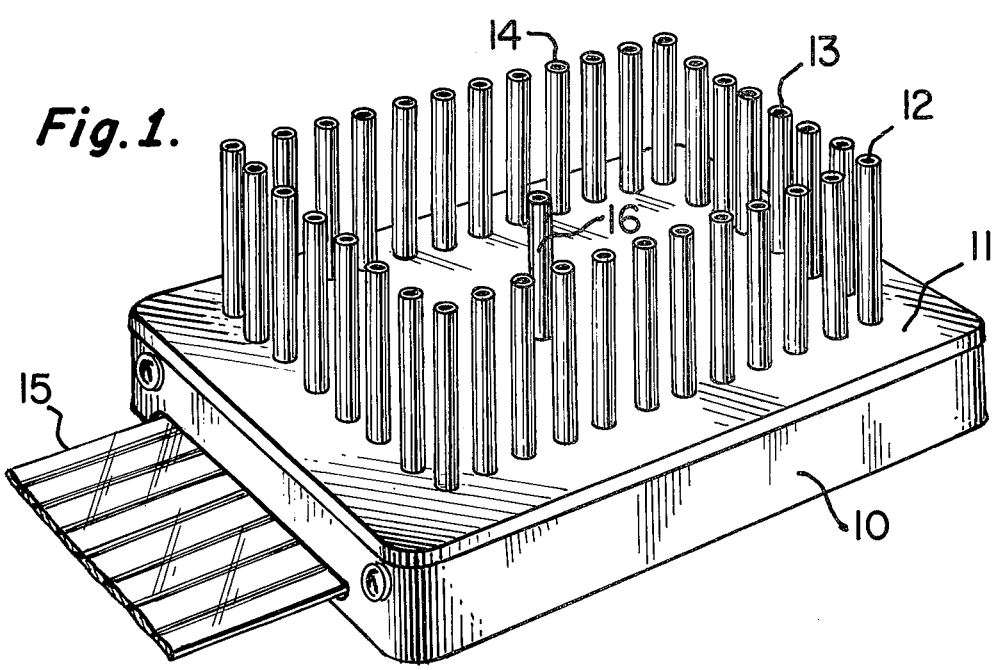
FIG. 1 is a perspective view of a transducer housing and assembly according to this invention.

Referring to FIG. 1, there is shown a perspective view of a transducer housing 10, which essentially is a typical integrated circuit flat-pack module. Such flat-packs are manufactured by a number of semiconductor fabricators and are used to house large scale integrated circuits or large integrated circuit assemblies. The housing 10 is relatively rectangular, although a circular, or any configuration housing would suffice as well. The housing includes a number of terminal areas (not shown) and can accommodate 96 or more terminal or lead areas. Such flat-packs are generally about 1.8 inches long and about 1.4 inches wide. A top cover plate 11 of the housing 10 has a plurality of apertures located therein for accommodating and receiving a pressure port. The top cover plate 11 is fabricated from Kovar or a similar material and 36 individual pressure ports as 12, 13 and 14 are braized, soldered or welded thereto.

The pressure ports or tubes as 12, 13 and 14 are shown as thirty-six about the periphery of the housing cover, but can be more or less in number depending upon the system, the size of the housing and so on. The pressure ports 12, 13 and 14 may be fabricated from a metal tubing and are each about 0.05 inches in diameter. It can be readily ascertained from the figure that a flexible tube or other tube can be coupled to each pressure port and directed to an area to be monitored.

Also shown extending from the side and directed underneath, is a flat-pack cable 15. The flat-pack cable usually comprises copper or other conductors enclosed between thin vinyl or insulating sheets and is used for externally connecting the transducers to biasing and monitoring circuits, as will be explained.

Also shown in FIG. 1 is a relatively central pressure port 16, which is used to provide a pressure reference for all pressure transducer diaphragms mounted within the housing 10.

Figure 2A:
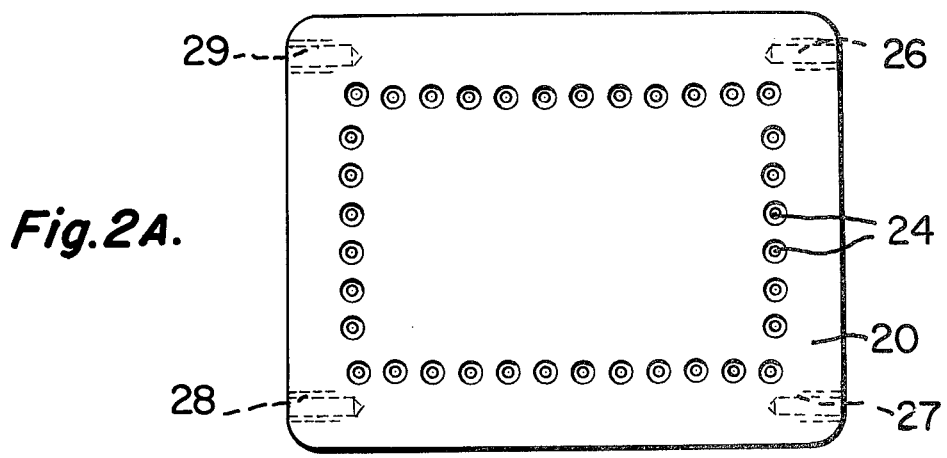
FIG. 2A is a front of a pressure port accommodating plate according to the invention.
Figure 2B:
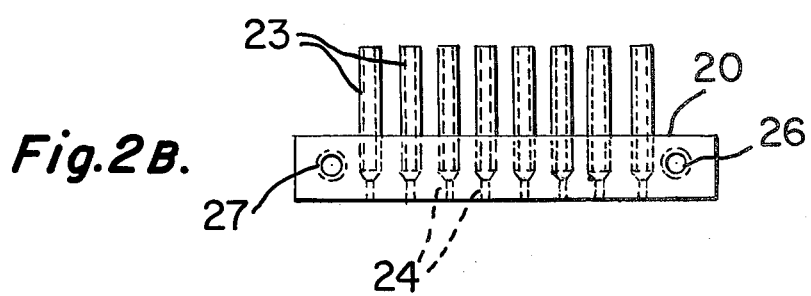
FIG. 2B is a side elevational view of the plate of FIG. 2A.

FIG. 2A shows a front view of the cover plate or pressure port accommodating plate 20. Thirty-six holes as 21 and 22 are located about the peripheral edges of the plate 20 and are tapped to accommodate and thence braize a pressure port tube into each hole as tube 23 of FIG. 2B. The holes are approximately 0.124 inches apart from their centers. A tube as 23 or pressure port is inserted therein and braized to the Kovar plate 20. The tapped portion of the hole as 24 of FIG. 2B will be used to communicate with the diaphragm of a pressure transducer, as will be explained.

Four screw accommodating apertures as 26, 27, 28 and 29 are located in the side of the cover or port accommodating plate 20 to provide coupling means for the remainder of the housing as 10 of FIG. 1.

Figure 3:
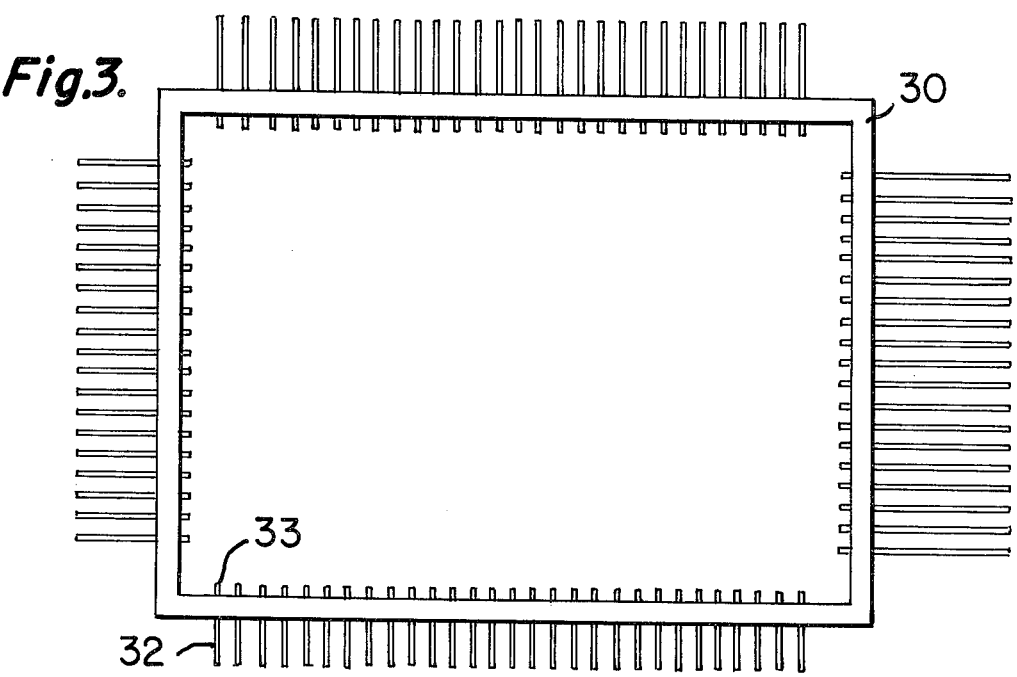
FIG. 3 is a front view of a flat-pack frame assembly used in the invention.

FIG. 3 shows a standard 96 pin flat-pack 30, which has the bottom cut-out and appears as a picture frame. Such flat-packs are used to house large integrated circuits and an example of a suitable unit is that one manufactured and sold by Isotronics, Inc. as Number 1P 1610 Flatpack baseplate. The base plate or flat-pack 30 is soldered by a gold solder to the cover port accommodating plate 20 of FIG. 2 to form the composite structure shown in FIG. 4.

Figure 4:
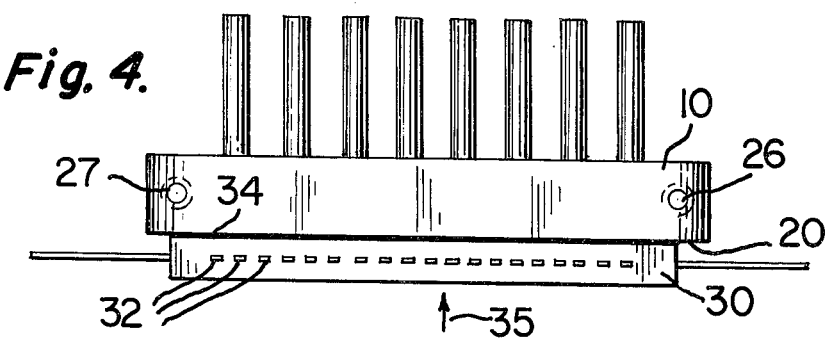
FIG. 4 is a side view showing the assembly of FIG. 3 bonded to the cover of FIG. 2B.

Thus in FIG. 4, the pressure port accommodating plate 20 is bonded at the periphery by a gold solder bond 34 to the flat-pack 30.

Figure 5:
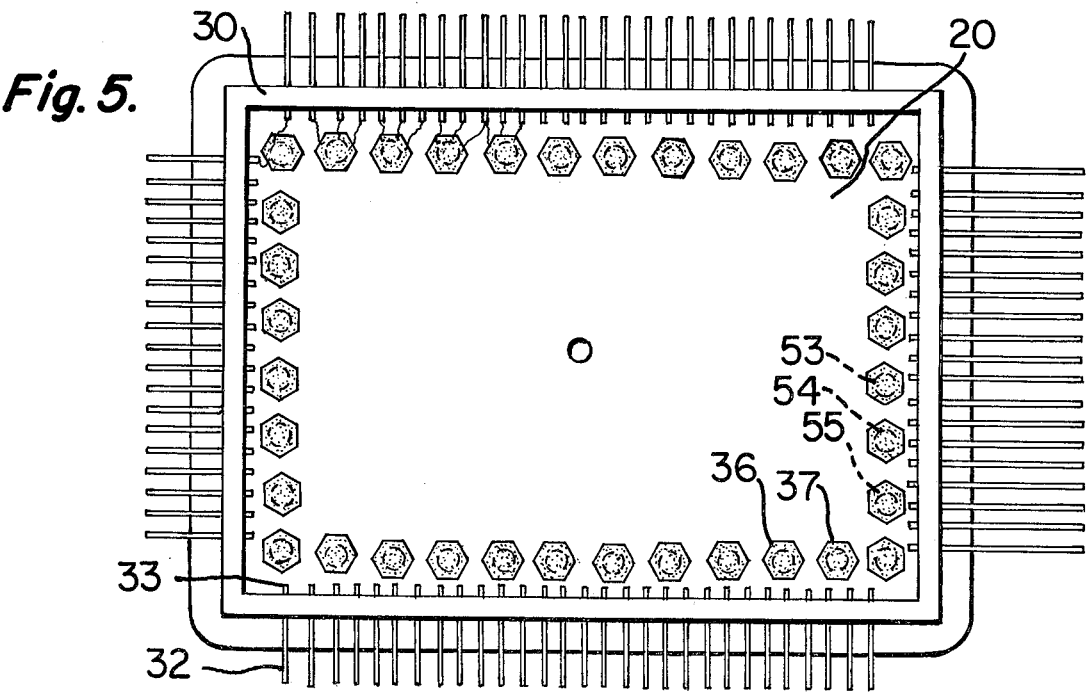
FIG. 5 is a front elevational view of a transducer arrangement.

FIG. 5 shows the view indicated in FIG. 4 by arrow 35.

Thus, as seen in FIG. 5, the pressure port accommodating plate 20 as bonded to the flat-pack frame 20, has the apertures or the tapped holes formed in plate 20 surrounded by the sides or "framed" by the flat-pack housing 30. Mounted and positioned over each hole is a hexogonal shaped pressure transducer or piezoresistive bridge assembly as 36 and 37. While the transducers 36 and 37 are shown as hexagonal, any other suitable configuration as circular and so on could be employed as well.

Each pressure transducer as 36 and 37 is a full bridge configuration fabricated from four piezoresistor semiconductors diffused or mounted on a silicon, glass or other flexible diaphragm. The diaphragms are 0.137 and 0.119 inch hex shaped integrated sensors in this example, but other configurations could be employed.

Figure 6:
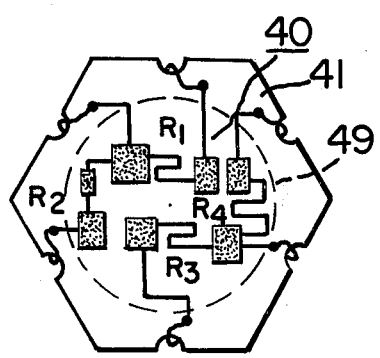
FIG. 6 is a top view of one type transducer element used in the invention.
Figure 7:
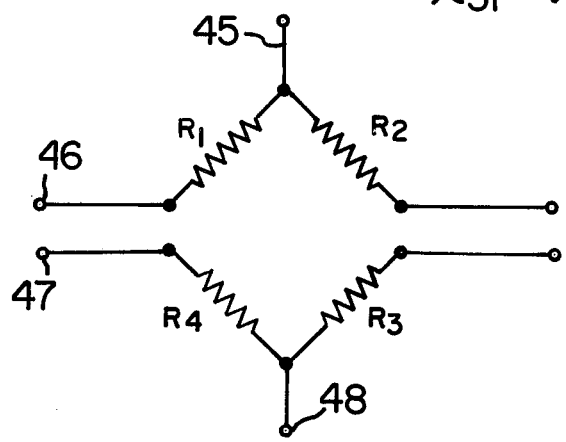
FIG. 7 is an electrical schematic included to show the circuit of a transducer bridge configuration.
Figure 9:
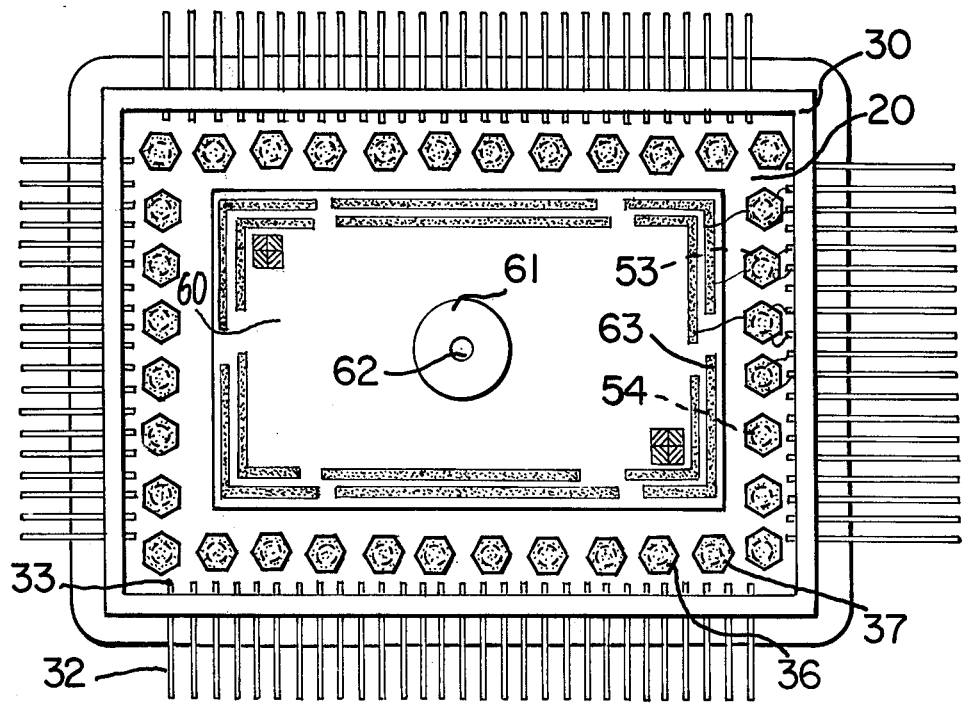
FIG. 9 is a top view of a transducer assembly according to one step in an assembly process.

Referring to FIG. 6, there is shown a piezoresistive network 40 including four semiconductor resistors $R_1$ to $R_4$ diffused or located on a thin silicon or glass diaphragm 41. The diaphragm 41 is hex shaped, but may be circular or any other geometrical configuration. The diaphragm may be 0.003 inches thick, more or less. A full bridge includes four piezoresistors which may be arranged in a typical Wheatstone array as shown in FIG. 7. The piezoresistors $R_1$ to $R_4$ are force or pressure sensitive and their resistance varies according to a force or pressure applied to an active area of the diaphragm 41. Such bridge configurations as well as the piezoresistive effect are well known. See an article entitled DEVELOPMENT AND APPLICATION OF HIGH TEMPERATURE ULTRA-MINIATURE PRESSURE TRANSDUCERS by A. D. Kurtz and J. Kicks, presented and published at the ISA Silver Jubilee Conference of October, 1970 held in Philadelphia, for examples of suitable bridge configurations.

Shown in FIG. 6 are contact terminals as 45, 46, 47 and 48 which are located about the periphery of the diaphragm 41 or the non-active area. The non-active area, not included within dashed line 49, does not readily deflect upon application of a force to the diaphragm 41. The area enclosed within dashed line 49 is the area on which the piezoresistors $R_1$ to $R_4$ are located and which does deflect upon applications of a force to the diaphragm 41. Thus, the piezoresistors $R_1$ to $R_4$ located within the active area will vary in resistance according to any applied force or pressure imposed upon the diaphragm 41.

In FIG. 7, the terminals of the bridge resistors $R_1$ to $R_4$ may be brought out as shown for purposes of applying biasing potentials to the bridge and for measuring the output of the bridge as for example, across contacts 45 and 48 or any other desired contacts.

Figure 8:
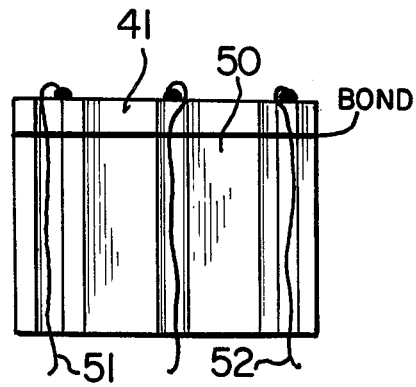
FIG. 8 is a side view depicting an embodiment of mounting a pressure diaphragm to a housing.

In FIG. 8, the thin diaphragm 41 is bonded to an insulating housing 50 fabricated of a glass and having a central aperture 51 congruent with the active area of the diaphragm. The housing may be slotted and leads as 52 directed through a slot or aperture 53 in the sidewall of the housing 51 to permit connection of the terminals or contacts as 45 to 48 to external circuitry for biasing or monitoring.

Again referring to FIG. 5, the transducer (FIG. 6) is mounted with the diaphragm 41 facing the open aperture or port accommodating recess in plate 20. Thus, each such aperture as 53, 54 and 55 have a transducer mounted with the active area thereof aligned with the aperture. The transducers are mounted by means of an epoxy or other type glue and the diaphragms as 41 are coated with a silicon grease for moisture proofing the same and protecting the diaphragm from the pressure producing environment.

Appropriate leads emanating from the transducer and indicative of the piezoresistor terminals are ball-bond to appropriate terminals on the flat-pack frame member 20.

A hybrid circuit board 60 fabricated from a ceramic material or any insulator has a series of terminal areas as 63 for paralleling common input or biasing leads of the transducers in order to eliminate multiple connections. Since the flat-pack housing 20 has only 96 pins, this is necessary. For example, the housing or assembly includes 36 transducers, each having at least five or six leads. The total number of leads would then be between 180 and 216, while the maximum number of flat-pack terminals is 96. Hence, the circuit board 60 has terminal area about the periphery to parallel input leads, common leads or biasing leads. The ceramic substrate circuit board 60 also has a central aperture 61 aligned with the center pressure port 62 in the Kovar pressure port plate 30.

This aperture 61 provides a pressure reference applied to pressure port 62 for the back side of the diaphragms or transducers as 36 and 37 included within the common housing. The appropriate transducer leads are also ball-bonded or soldered to the bonding pads or contact areas of the board 60.

The board 60 is bonded to the top pressure plate 30 by epoxy or otherwise.

Figure 10:
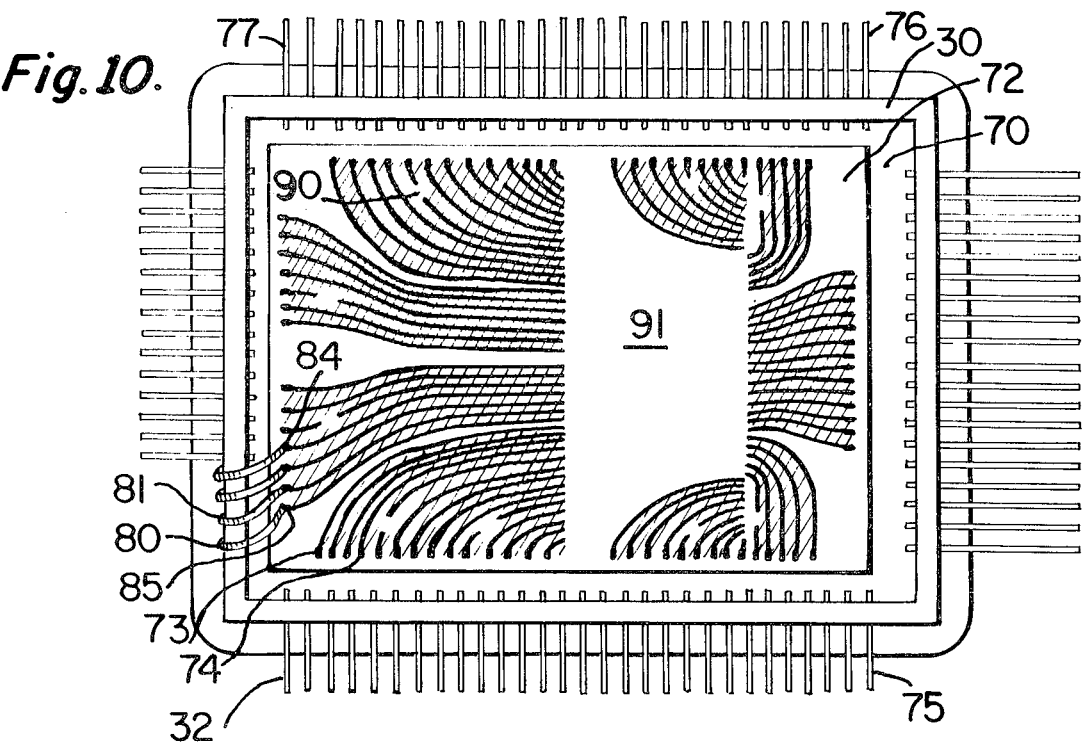
FIG. 10 is a top view of a transducer assembly according to a subsequent step in an assembly process.

A flat Kovar plate 70 as shown in FIG. 10, is then bonded over the flat-pack and covers the transducers and ceramic circuit board.

A printed circuit board 72 is epoxied to the Kovar plate 60 in a predetermined central position. The printed circuit board 72 as secured to the plate 70, has a plurality of conductors deposited thereon as shown and located with land areas as 73 and 74 with respect to the terminal leads as 32, 74, 75, 76 and 77 of the flat-pack.

The leads of the flat-pack 30 are then bent around over the top and soldered to the terminal areas on the board 72. This is shown for leads 81 and 82 as soldered to the terminals 83 and 84 of the printed circuit board 72.

There are also shown breaks in certain conductor paths as 90, for insertion on the board 72 of a thick film resistor used for compensation of the bridge circuits.

As seen in area 91 of board 72, there are two rows aligned of terminals. Two flat-pack connectors as shown in FIG. 1 are soldered thereto and hence provide 84 output terminals for the 36 transducer assembly shown.

Figure 11:
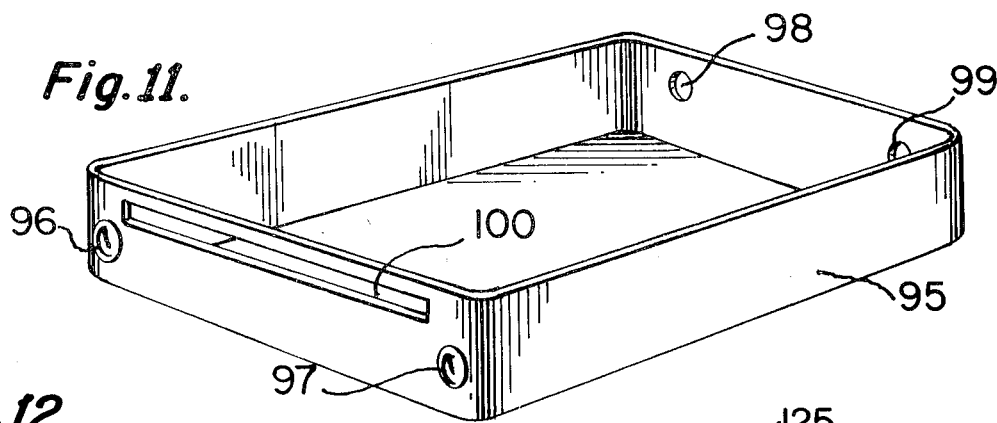
FIG. 11 is a perspective view of an enclosure member for the transducer assembly.

A cover member is shown in FIG. 11. The member 95 has a slot 100 through which the flat-pack cables are directed. The apertures 96 to 99 are positioned to align with the screw accommodating apertures 26 to 29 (FIG. 2A) in the top pressure port plate 20 and hence, the package and assembly is as shown in FIG. 1.

Thus a unique housing for a plurality of pressure transducers, each having a separate port, each subjected to the same temperature and bonding techniques and each therefore operating reliable. The entire assembly is extremely small as being about 1⅞ inches long and 1 7/16 inches wide and approximately 0.5 inches deep, not including the height of the pressure port cylinders.

Since the unit is so small, it can be mounted in the wind tunnel and hence, the tubing added to monitor the desired pressure points on a test object is kept short, avoiding all sorts of problems with tubing errors and fluctuations.

Figure 12:
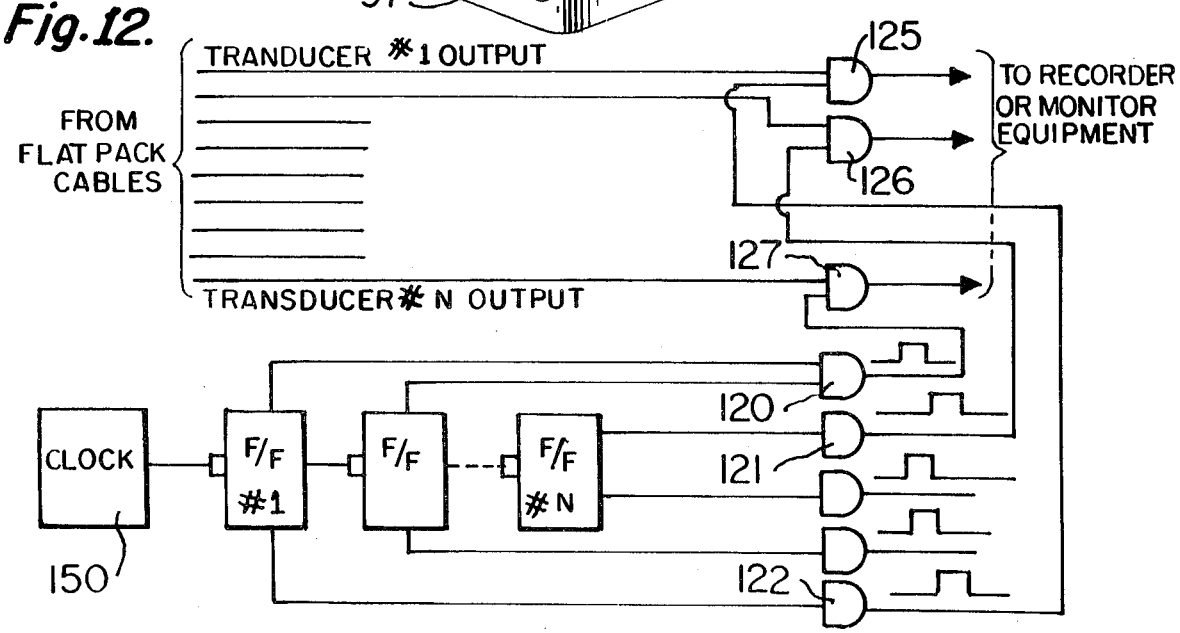
FIG. 12 is a partial schematic and block diagram of one type of scanning circuit to be used in conjunction with the transducer assembly.

FIG. 12 shows a scanning technique useful for monitoring the outputs of the transducer circuits.

Each bridge output terminates in the flat-pack cable as wired to the board 72 of FIG. 10.

Shown in FIG. 12 is a plurality of leads labelled as transducer 1 output to transducer N output. As shown, the flat-pack housing includes 36 units, but more or less can be accommodated in other housings as TO-5 headers and so on.

One type of a scanner comprises a chain of flip-flops or binary multivibrators arranged in a counting configuration, shown as F/F 1 to F/F N. The decode gates 120, 121, 122 decodes all states of the flip-flop and provide a time sequential series of pulses at the output or time slots. Each transducer output is coupled to a selective gate as 125, 126 and 127. These may be AND gates or operational amplifiers. Each gate 125 to 127 has an input coupled to the output of the counter decode gates 120 to 122 and will be activated only during the associated time slot. Hence the output of transducer 1 will be monitored via gate 125, only during the time slot decoded by gate 125.

The counter is driven by a clock or oscillator 150, at a relatively high rate determined only by the recording equipment or the desire of the user.

The prior art problems of scanning are circumvented due to fact that each transducer always has pressure applied thereto and hence, the rate of scanning is not determined by the settling time as in prior art scanned transducers.

There are many integrated chip assemblies available designated as multiplexers, scanner and so on which employ binary counters, shift registers and so on and which include on the integrated circit (IC) board, the decode gates as 120 to 122 as well as the gates 125 to 127.

Such a chip can be mounted directly in the housing as on board 72 or plate 70 and all scanning connections implemented within the housing shown.

This feature is also of extreme importance and quite advantageous. Alternatively, if desired, electronic scanning can be done externally.

A unique transducer capable of being electrically scanned has been provided, which transducer assembly will operate more reliably and efficiently than those in the prior art.

We claim:

1. A multiple pressure port transducer apparatus, comprising:
   a. a hollow housing including mounted therein, a plurality of pressure transducers, each of said transducers including a silicon diaphragm having at least one pressure sensitive piezoresistor element diffused thereon and located within a central region, said diaphragm mounted on an annular glass member with the aperture of said member defining an active deflection area for said diaphragm, said plurality of transducers being encased within said hollow of said housing and located relatively about the periphery thereof, said housing including a top surface having a plurality of tubular cylindrical pressure ports coupled to said apertures in said surface, each one of which being aligned with one selected one of said transducers, in said housing, whereby each transducer is associated with one tubular pressure port, a slot in said housing for accommodating a plurality of leads and means for coupling selected ones of said leads to selected ones of said transducers, whereby each transducer has at least one lead associated therewith for monitoring any change in said pressure sensitive element caused by a force applied to any one of said ports and therefore to said aligned diaphragms, and means coupled to said selected leads for selectively scanning said transducers to monitor each separate one.

2. The pressure transducer apparatus according to claim 1 wherein said housing is relatively rectangular in shape.

3. The pressure transducer assembly according to claim 1 wherein said tubular cylindrical pressure ports are braized within said apertures.

4. The pressure transducer assembly according to claim 1 wherein each diaphragm includes a piezoresistive bridge configuration mounted thereon.

5. A multiple output pressure transducer, comprising:
 a. a first framelike member including a plurality of terminals extending from the periphery thereof,
 b. a cover member having a plurality of apertures on a surface thereof and dimensioned to cover said frame like member with said apertures being surrounded by said frame like member when the two are placed in congruency,
 c. a plurality of tubular, pressure ports each one located in one of said apertures on surface of said cover member,
 d. a plurality of pressure transducers having an active diaphragm area which deflects upon application of a force thereto, each positioned within said frame member with said active area in close proximity to one of said pressure ports, whereby a force exerted at said port will cause said diaphragm to deflect,
 e. means for coupling each of said pressure transducers to a different one of said terminals extending from said frame like member for monitoring said force as applied to said diaphragm, and
 f. a scanner coupled to said terminals for providing a plurality of time slots, each time slot associated with one of said transducer terminals to select any desired one in a designated time sequence.

6. The transducer according to claim 5 wherein said frame like member is rectangular in shape and is a flat-pack integrated circuit header.

7. The transducer according to claim 5 wherein said frame like member is bonded to said cover member about the periphery of said frame.

8. The transducer according to claim 5 wherein said pressure transducers include piezo-electric bridge configurations, each mounted on a silicon diaphragm.

9. The transducer according to claim 5 wherein said cover member is fabricated from Kovar.

10. The transducer according to claim 5 wherein said diaphragms of said pressure transducers are fabricated from silicon and a glass ring associated with and coupled to each diaphragm to define said active area.

* * * * *